Nov. 22, 1938.  H. G. AXTMANN  2,137,522
BRAKE
Original Filed Jan. 25, 1934   3 Sheets—Sheet 1
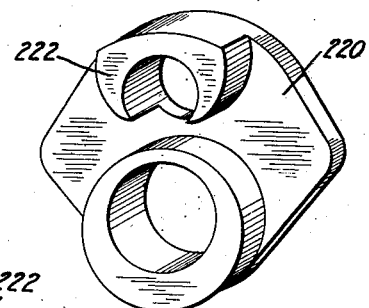
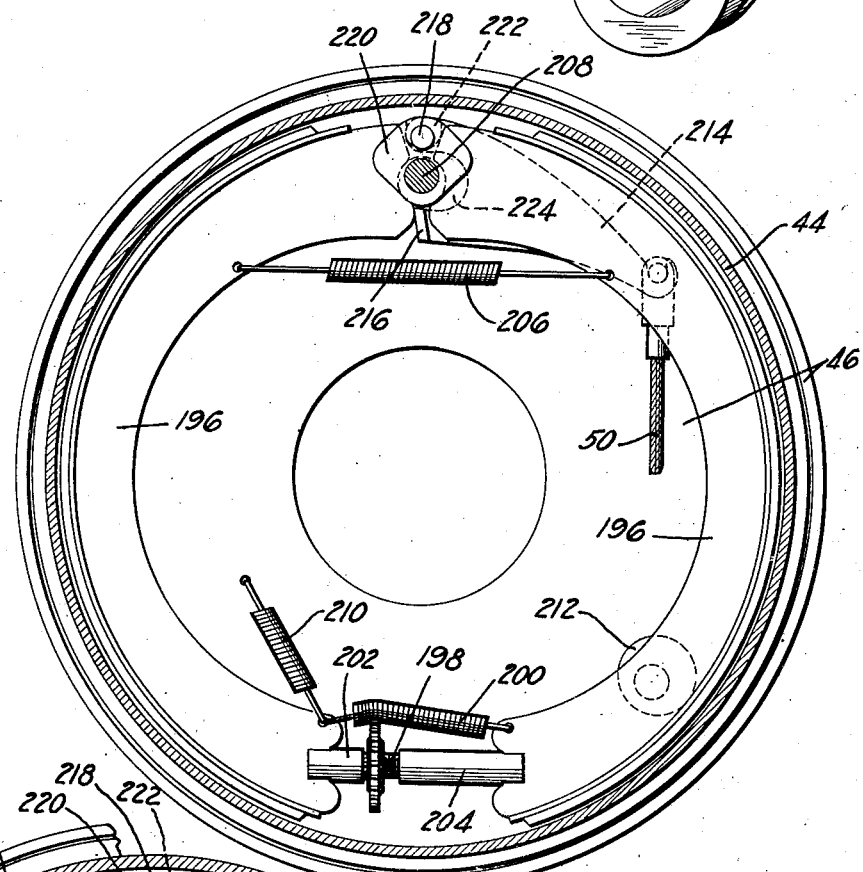
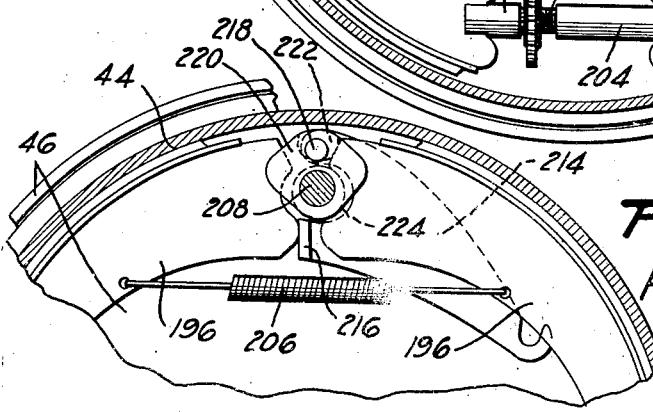
INVENTOR.
HAROLD G. AXTMANN
BY
ATTORNEY Nov. 22, 1938.   H. G. AXTMANN   2,137,522
BRAKE
Original Filed Jan. 25, 1934   3 Sheets-Sheet 2

INVENTOR.
HAROLD G. AXTMANN
BY
ATTORNEY

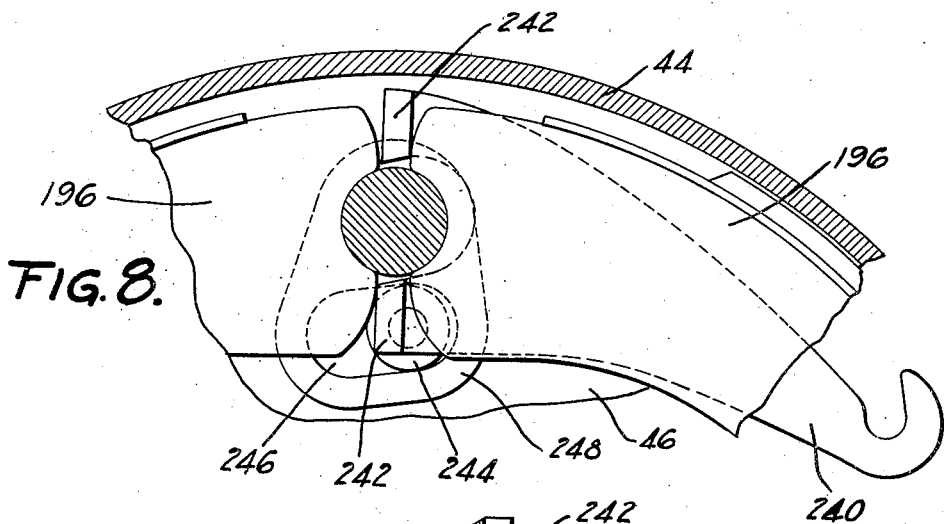
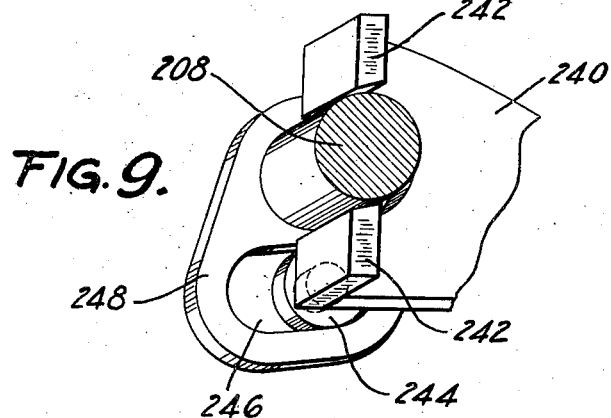
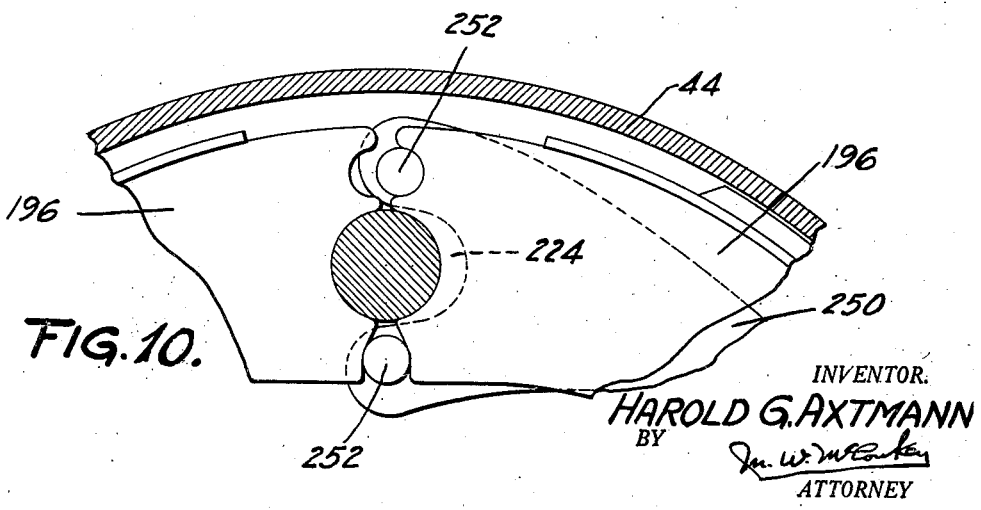

Patented Nov. 22, 1938

2,137,522

UNITED STATES PATENT OFFICE 2,137,522

BRAKE

Harold G. Axtmann, Dearborn, Mich., assignor to Bendix Aviation Corporation, South Bend, Ind., a corporation of Delaware Original application January 25, 1934, Serial No. 708,171, now Patent No. 2,074,715, dated March 23, 1937. Divided and this application August 10, 1936, Serial No. 95,254

6 Claims. (Cl. 188—78)

This invention relates to brakes, and is illustrated as embodied in an internal expanding brake for an automobile wheel.

An object of the invention is to provide actuating means for a brake of the shiftable anchorage type arranged to act substantially uniformly in forward and reverse braking. To this end there may be a part mounted on the brake anchor, arranged between the ends of the shoes, and which acts on one of the shoes at one side of the anchor, and to which is operatively connected a lever or the like acting on the other shoe at the other side of the anchor. The connections, as explained below, are preferably arranged to give substantially equal braking action.

Various features of novelty are embodied in the specific constructions and arrangements of parts of the several embodiments described below. These and other features of the invention will be apparent from the following description of the illustrative embodiments shown in the accompanying drawings, in which:

Figure 1 is a vertical section through a brake embodying one form of the invention, in a plane just inside the head of the brake drum, and showing the friction shoes in side elevation;

Figure 2 is a similar view of the same brake, but showing only the upper part of the brake, and showing the shoes applied against the drum, with the vehicle moving forward;

Figure 3 is a perspective view of part of the applying means of the brake of Figure 1;

Figure 8 is a partial section corresponding to Figures 4–6, but showing another modification of the applying means;

Figure 9 is a partial perspective of the applying means of Figure 8, with the brake shoes removed; and Figure 10 is a partial section corresponding to Figures 4–6, but showing another modification of the applying means.

Figure 4:
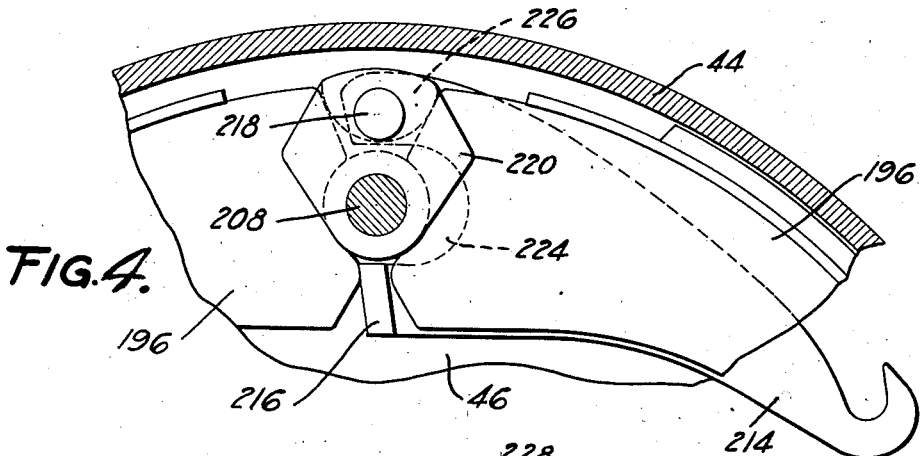
Figures 4, 5 and 6 are partial sections, corresponding to the upper part of Figure 1 but on a larger scale, showing different modified arrangements of the applying means.

The brake illustrated in Figures 1, 2 and 3 comprises in combination with the drum 44 and the backing plate 46 friction means such as a pair of floating shoes 196 having a floating adjustable connection including a rotatable member 198, yieldingly locked by a spring 200 connecting the shoes, and having a smooth left end journaled in a socket 202 notched to embrace the end of one shoe and having a threaded right end threaded into a socket 204 notched to embrace the end of the other shoe.

The shoes are urged by a return spring 206 against an anchor or post 208 arranged between the unconnected ends of the shoes, while an inclined auxiliary return spring 210 urges one of the shoes against an adjustable eccentric stop 212.

The brake is applied by a lever 214, connected to the end of the corresponding cable 50, and which has a thrust lug 216 wedgingly engaging the end of the left-hand shoe. The lever 214 is connected by a pivot 218 with a member 220 the back of which is shown in detail in Figure 3, and which is pivoted on the anchor post 208.

The member 220 has a lug portion 222, shown surrounding the pivot 218, and which engages the other of the shoes. This forms a two part applying device, one part of which is pivoted on the anchor, and which has substantially equal action on the two shoes. The webs of the shoes are embraced between the lever 214 and the head of the pivoted member 220. The body of the lever is cut away at 224, to clear the anchor.

The arrangement of Figure 4 differs from that just described mainly in the wedging or cam surface of the lug 226, formed on the member 220 and corresponding to lug 222. The curve of lug 222 is substantially on the arc of a circle and engages the end of the shoe with a substantially tangential thrust. The lug 226, on the other hand, engages the shoe web substantially at its outer edge and, since it swings about the anchor 208, has a considerable component urging the shoe downwardly in the brake in forward braking, thus tending to cause the heel of the shoe to engage the drum slightly before the toe.

Figure 5:
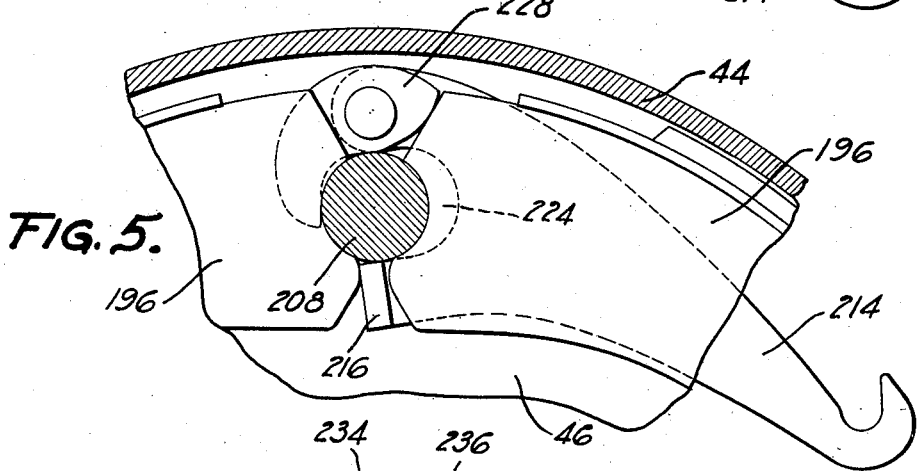

In Figure 5, the lever 214 has pivotally mounted thereon a thrust cam 228 in thrust engagement with the end of one shoe and having a tail portion guidingly engaging the anchor post 208.

Figure 6:
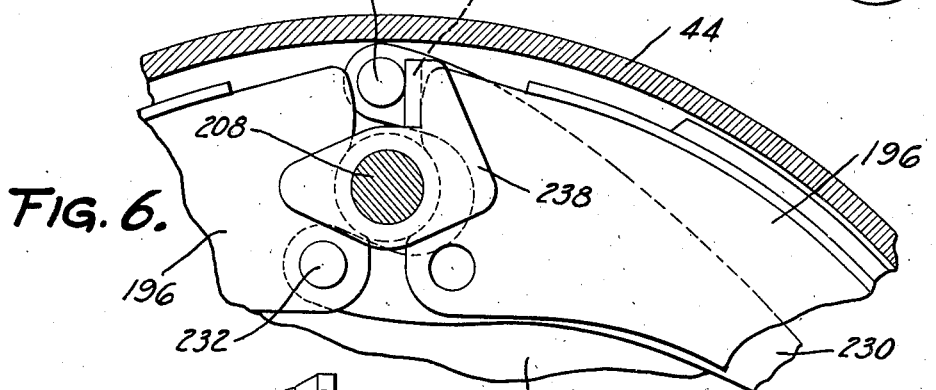
Figure 7:
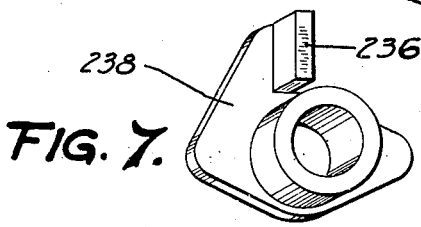
Figure 7 is a perspective view of part of the applying means of Figure 6.

Figure 6 shows a lever 230 corresponding to lever 214 having a portion bridging across below the anchor 208 and connected to the left-hand shoe by means such as a pivot 232. Above the anchor the lever 230 has a thrust pin 234 wedgingly engaging a lug 236 on a member 238 (shown in reverse in Figure 7) pivoted on the anchor 208 and which lug 236 is also in thrust engagement with the end of the right-hand shoe.

In Figures 8 and 9 a lever 240 (corresponding to the lever 214) has two thrust lugs 242 on opposite sides of the anchor, and also has a pin carrying a roller 244 riding in and supported by an inclined cam-slot 246 in a member 248 fixedly mounted on the anchor 208.

Figure 10 shows a floating lever 250 provided, on opposite sides of the anchor, with two thrust pins 252. The upper pin 252 is received in registering semi-circular notches in the ends of the shoe webs, and the lower pin 252 has wedging engagement with inclined cam surfaces on the ends of the shoe webs.

In operation, force applied in tension on the cable 50 serves to spread the shoes apart to apply the brake. In Figure 1, in forward braking the spring 210 pulls at such an angle as to hold the left-hand shoe 196 (the "secondary" shoe) against the anchor, while the lever 214 fulcrums on lug 216 engaging the left-hand shoe 196 and lug 222 thrusts the right-hand shoe 196 (the "primary" shoe) against the drum. In reverse braking, the action is the same for the brief instant before the primary shoe has any frictional engagement with the drum. As soon as there is such engagement, however, and even before either shoe fully engages the drum, the wiping action of the drum (rotating counter-clockwise) forces the primary (right-hand) shoe back against the anchor. From there on the lever 214 fulcrums on the pivot 218, and lug 216 forces the secondary (left-hand) shoe away from the anchor and against the drum.

In the case of Figure 4, the action is substantially the same as just described, except that the heel of the primary shoe engages the drum somewhat sooner. In Figure 5, in forward braking the applying lever acts as described above except that the thrust lug 228 engaging the primary shoe can turn on its pivot under the control of the camming engagement of the tail portion riding on the anchor 208, so that its angle of thrust may be changed as desired at different stages of brake application. In reverse braking the action will be as previously described.

In the arrangement of Figure 6, the lever 230 fulcrums on pivot 232 in forward braking, the applying action being by thrust lug 236 acting on the right-hand shoe; in reverse braking the pin 234 of the lever fulcrums slidably against lug 236, and pivot 232 acts to apply the brake. In Figure 8 the lugs 242 apply the brake, the lower one serving as a fulcrum in forward braking and the upper one in reverse braking. The action of the lever is controlled by the shape and inclination of the cam slot 246. In Figure 10 the lever 250 fulcrums slidably on the lower lug 252 in forward braking, and pivots as a fulcrum on the upper lug 252 in reverse braking.

While several illustrative embodiments have been described in detail, it is not my intention to limit the scope of the invention to those particular embodiments, or otherwise than by the terms of the appended claims.

The present application is a division of my application No. 708,171, filed January 25, 1934.

I claim:

1. Brake mechanism comprising friction means having adjacent separable ends, an anchor between said ends, a part pivoted on said anchor and having means operatively engaging one of said ends on one side of the anchor, and a floating lever pivoted to said part at said side of the anchor and formed to clear said anchor and movable independently of said anchor, and having means operatively engaging the other of said ends at the other side of the anchor.

2. Brake mechanism comprising friction means having adjacent separable ends, an anchor between said ends, a part pivoted on said anchor and having means operatively engaging one of said ends on one side of the anchor, and a floating lever pivoted to the other of said ends at the other side of the anchor and arranged to clear said anchor and having wedging engagement with said part for operating it.

3. Brake mechanism comprising, in combination with friction means having an anchor between adjacent separable ends, an applying device including a member pivotally mounted on said anchor, a lever clearing said anchor and pivoted to said member at one side of the anchor and swinging parallel to the brake beside the friction means, and parts carried by said member and said lever and which are in thrust engagement with said separable ends respectively at opposite sides of said anchor.

4. Brake mechanism comprising, in combination with a backing plate having mounted thereon friction means having an anchor between adjacent separable ends, an applying device including a lever arranged between the friction means and the backing plate and swinging parallel to the brake beside the friction means and having a part in direct thrust engagement with one of said ends at one side of the anchor, and a member pivotally connected to and supporting said lever and which is in thrust engagement with the other of said ends at the other side of the anchor, said lever being formed between said part and the pivotal connection with said member with an opening affording clearance for said anchor.

5. Brake mechanism comprising, in combination with a backing plate carrying friction means and having an anchor projecting between adjacent ends of the friction means, and applying means having thrust parts engaging said ends respectively on opposite sides of the anchor and which means includes movably connected parts, one of which is pivoted on the anchor and the other of which is a lever swinging in the space between the backing plate and the friction means.

6. Brake mechanism comprising separable shoes having an anchor between their ends, an applying lever directly engaging one shoe on one side of the anchor, and a part mounted on said anchor and having on the other side of the anchor means operated by said lever and engaging the other shoe to apply it.

HAROLD G. AXTMANN.